United States Patent [19]

Prusic

[11] 4,208,953
[45] Jun. 24, 1980

[54] PLUNGER FOR COMPRESSORS

[75] Inventor: Milinko Prusic, Johanneshov, Sweden

[73] Assignee: Sandvik Aktiebolag, Sandviken, Sweden

[21] Appl. No.: 841,014

[22] Filed: Oct. 11, 1977

[30] Foreign Application Priority Data

Oct. 15, 1976 [SE] Sweden ................... 7611449

[51] Int. Cl.² .................... F16J 1/02; F16J 1/06
[52] U.S. Cl. .......................... 92/193; 92/182; 92/257
[58] Field of Search ............... 92/182, 181 R, 195, 92/257, 258, 110, 176, 193, 183; 277/72 R, 3, 16, 34

[56] References Cited

U.S. PATENT DOCUMENTS

| 1,731,147 | 10/1929 | Moyer et al. | 92/257 X |
| 1,764,458 | 6/1930 | McLean | 92/110 |
| 2,413,347 | 12/1946 | Hamilton et al. | 92/258 X |
| 2,874,012 | 2/1959 | Stern | 92/182 |
| 3,187,839 | 6/1965 | Prather | 92/182 X |
| 3,335,643 | 8/1967 | Wentworth | 92/182 |
| 3,471,079 | 10/1969 | Myers | 92/181 X |
| 3,490,344 | 1/1970 | Archer | 92/169 X |
| 4,044,655 | 8/1977 | Kennicott | 92/258 |

FOREIGN PATENT DOCUMENTS 393787 6/1933 United Kingdom ............... 92/182

Primary Examiner—Irwin C. Cohen
Attorney, Agent, or Firm—Burns, Doane, Swecker & Mathis

[57] ABSTRACT

A plunger comprises a carrier and a hollow sleeve portion extending around a portion of the carrier. The sleeve portion rests between longitudinally spaced radial shoulders of the carrier. A portion of the carrier disposed within the sleeve is radially spaced from the sleeve to form a gap, which gap is pressurized to counteract pressures acting exteriorly on the sleeve portion. The gap can communicate with the environment surrounding the plunger so that external pressures pressurize the gap before or during plunger operation. The carrier may comprise a body portion and a cover portion which are connected by means of extensions which project through the sleeve portion. The sleeve portion can be formed of a material having a smaller coefficient of expansion than the body portion or cover portion.

5 Claims, 2 Drawing Figures

PLUNGER FOR COMPRESSORS

BACKGROUND AND OBJECTS OF INVENTION

The present invention relates to a plunger which is suitable for use in high pressure compressors, for instance, for the production of plastic materials.

The production of plastic materials is often made according to a so-called high pressure process, in which the pressure is between 1000 and 3500 bar (100–350 MPa). This fact makes particular demands upon the materials which are used in the process.

Earlier plungers of steel have been used but since it has been evident that the wear becomes very great, solid plungers of cemented carbide have been used. Cemented carbide, however, is an expensive material and has considerably higher density than steel. This means that a plunger wholly made of cemented carbide is very heavy and causes wear on moving parts in the compressor.

It is, therefore, an object of the present invention to minimize or obviate problems of this sort.

It is another object of the invention to provide a durable, light-weight plunger which is less expensive.

BRIEF DESCRIPTION OF THE INVENTION

The present invention combines the advantages of the high wearing strength of the solid cemented carbide plunger with the relatively low weight of the steel plunger. Owing to that fact, the plunger of the invention becomes substantially cheaper than those solid cemented carbide plungers being used presently in the industry.

In accordance with the present invention a plunger comprises a carrier and a hollow sleeve portion extending around a portion of the carrier. The sleeve portion rests between longitudinally spaced radial shoulders of the carrier. A portion of the carrier disposed within the sleeve is radially spaced from the sleeve to form a gap therebetween, which gap is pressurized to counteract pressures acting exteriorly on the sleeve portion.

The gap can communicate with the environment surrounding the plunger so that external pressures pressurize the gap before or during plunger operation.

The carrier may comprise a body portion and a cover portion which are connected by means of extensions which project through the sleeve portion. The sleeve portion can be formed of a material having a smaller coefficient of expansion than the body portion or cover portion. For example, the sleeve portion can be formed of cemented carbide and the carrier formed of steel, with the gap accommodating relative thermal expansion therebetween.

THE DRAWING

One embodiment of the invention shall be explained in greater detail with reference to the accompanying drawing in which FIG. 1 is a longitudinal cross-sectional view of one embodiment of the plunger and, FIG. 2 is a longitudinal cross-sectional view of another embodiment of the plunger in which the gap is closed off after being pressurized.

DETAILED DESCRIPTION OF A PREFERRED EMBODIMENT

Figure 1:
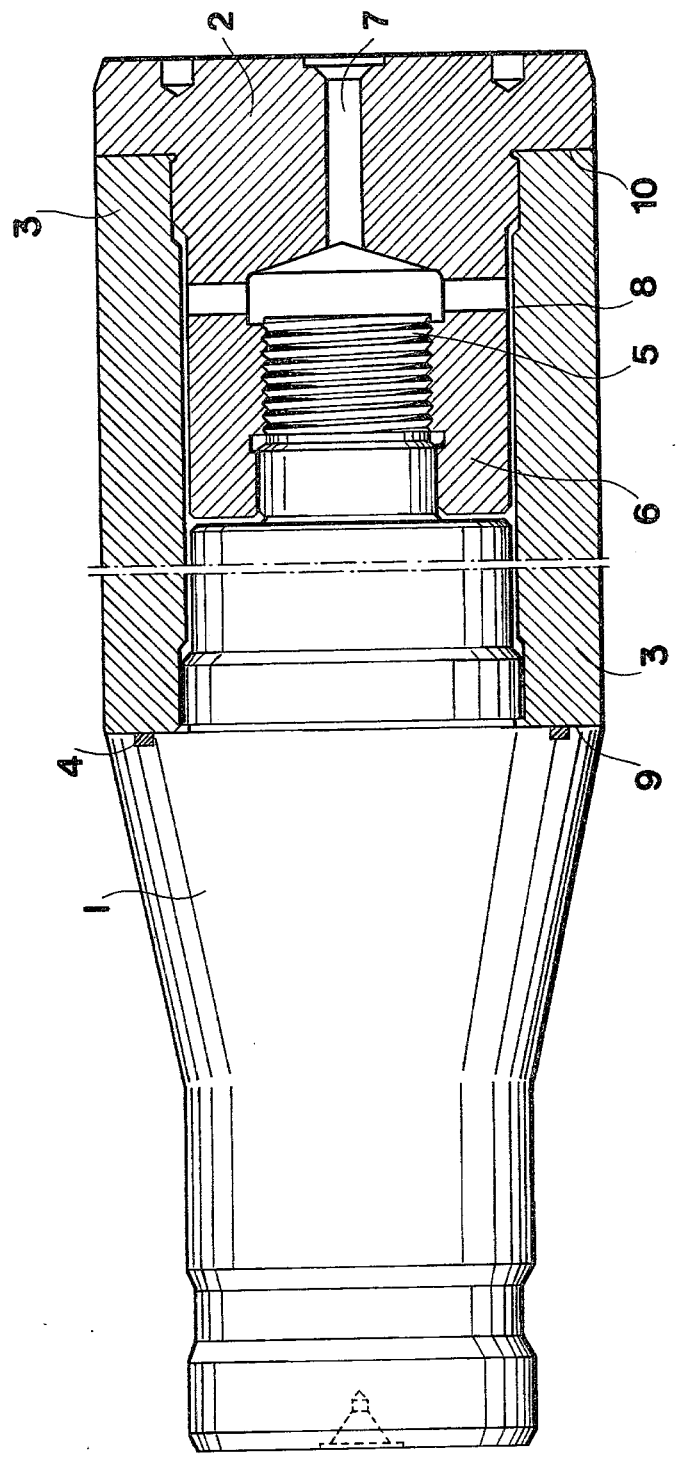

Referring now to FIG. 1 of the drawing there is shown a plunger composed of three parts, viz., steel body 1, a steel cover 2 and a hollow cemented carbide sleeve 3. The body 1 and cover 2 constitute a carrier assembly upon which the sleeve 3 is mounted. During the reciprocating movement of the plunger there arises great wear of the cylindrical jacket surface of the plunger against sealing rings which are stationary in the inner wall of the compressor cylinder. Thus, the purpose for providing the steel plunger with a cemented carbide sleeve is to make the plunger more resistant against this wearing and other wear, for instance thermo-shocks.

The steel body 1 is provided with a centrally and outwardly projecting extension 5, the diameter of which decreases outwards in steps, and the outer end of which is provided with external threads. The steel cover 2 is provided with an extension 6 extending inwardly towards the extension 5. The extension 6 has a central hole provided with internal threads, whereby the cover 2 can be screwed onto the steel body 1. This body 1 and the steel cover 2 include longitudinally spaced radial shoulders 9 and 10 against which the cemented carbide sleeve 3 rests. Moreover, at the ends of the sleeve, internal portions of the sleeve 3 rest against cylindrical parts of the extensions 5, 6. Seals can be inserted within the radial shoulders 9, 10, one of which 4 being illustrated. The seals may comprise Teflon O-rings.

The diameter of the outer part of the steel cover 2 is about the same as that of the cemented carbide sleeve, whereby the cover 2 radially covers the outer end of the cemented carbide sleeve. In the steel cover 2 there are one or more channels 7 arranged for the supply of working medium, i.e. the same medium that shall be compressed by the plunger, or any other medium, to the internal parts of the plunger.

The expansion coefficient for steel is about twice that of cemented carbide. This leads to the result that if the cemented carbide sleeve 3 along its whole length were to rest directly against the steel parts 1, 2 of the plunger there would be a great risk for the cemented carbide sleeve to burst, since cemented carbide is a brittle material, and since the temperature becomes high during the compressor work. Because of this fact there is formed an annular radial gap 8 between the cemented carbide sleeve 3 and the steel parts, which gap is in communication with the channels 7 in the steel cover 2. Hence, the steel part can freely expand relative to the sleeve 3.

As was mentioned in the beginning of this specification the present invention can be used in compressors characterized by very high pressures. When so used there arise high outer pressures on the jacket-surface of the plunger. Since there is a gap 8 between the cemented carbide sleeve and the steel parts, there is a risk for the outer pressure to damage the cemented carbide sleeve. Therefore, it is important to arrange a counter-pressure acting from inside on the cemented carbide sleeve. This can be achieved by allowing the medium being compressed in the compressor cylinder to freely flow into the plunger to the gap 8 via the channels 7.

Figure 2:
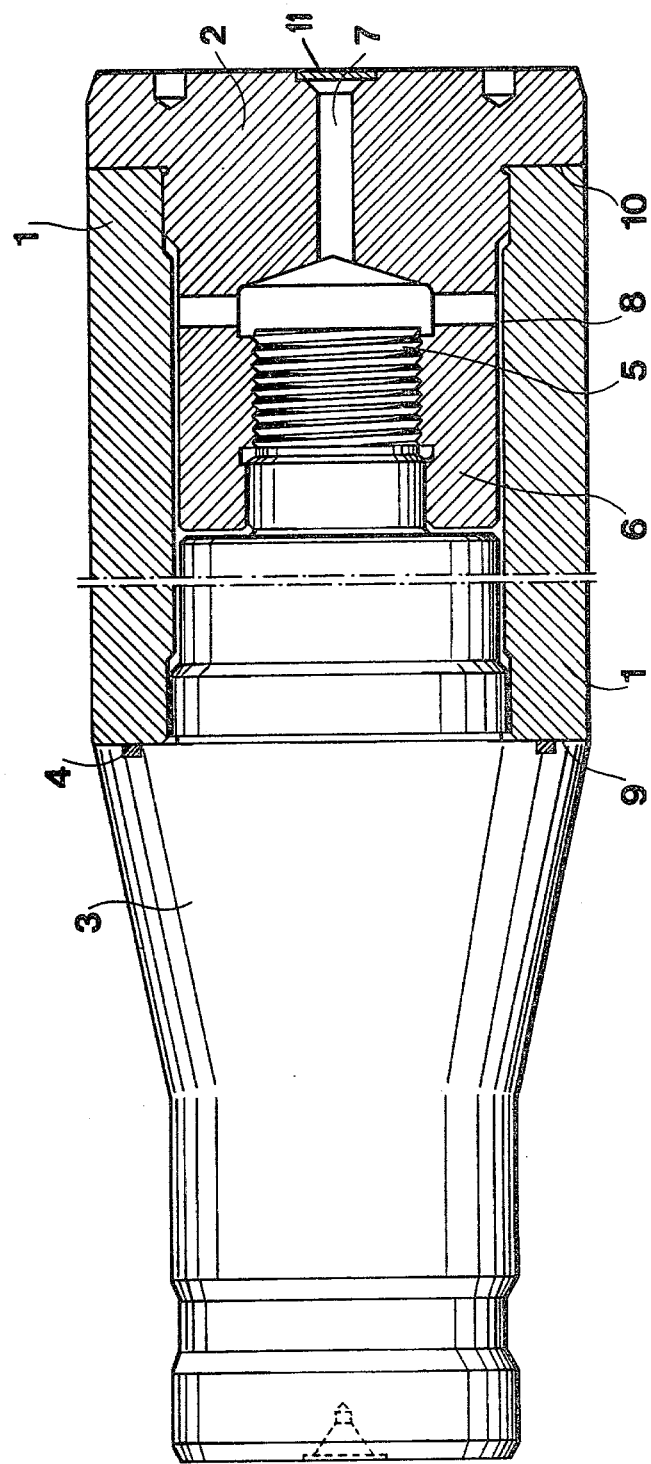

The counter-pressure could also be provided by the injection of a medium, for instance oil or plastic, under high pressure into the inner part of the plunger before using the same, whereafter the opening of the channel 7 on the top side of the steel cover is closed as by a plug 11 (FIG. 2) or any suitable means. Thereby in the gap 8 there arises a pressure on the inner wall of the cemented carbide sleeve, which pressure at least to a certain extent balances the outer pressure on the cemented carbide sleeve, whereby breaking of the same can be avoided.

It will be understood that the invention is not limited to the embodiment described above. Thus, materials other than steel and cemented carbide can be used and instead of providing the extension-receiving hole and the channel in the cover they can be formed in the body.

In accordance with the present invention, the gap enables pressures acting externally on a plunger sleeve to be counteracted from within. The sleeve can be formed of a harder material than the body or cover portions, with relative thermal expansion being accommodated by the gap. Hence, the plunger exhibits high wear resistance and yet is relatively light and less expensive.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A plunger for compressors comprising:
    a steel carrier;
    a rigid hollow sleeve portion made of cemented carbide extending around a portion of said carrier assembly and resting between longitudinally spaced shoulders of said carrier;
    a portion of said carrier disposed within said sleeve being radially spaced from said sleeve to form a gap therebetween containing a pressurized medium;
    at least one channel formed in said carrier and communicating with the gap for introducing the pressurized medium into said gap; and
    means closing-off said channel to isolate said gap from the exterior of said plunger to retain the pressurized medium within said gap to counteract pressures acting exteriorly on said sleeve portion during operation of the plunger.

2. A plunger according to claim 1, wherein said carrier comprises a body portion and a cover portion disposed on opposite ends of said sleeve portion; one of said shoulders being formed in said body portion and the other shoulder formed in said cover portion.

3. A plunger according to claim 2, wherein said body portion includes an outwardly extending extension which mates with a hole in an inwardly projecting extension in said cover portion.

4. A plunger according to claim 3, wherein said body extension includes external threads and said cover extension includes internal threads for coupling said body and cover together.

5. A plunger according to claim 1, wherein said carrier includes a radially disposed front face forming a pressurizing face of the piston, said channel extending from said face to said gap.

* * * * *